US008605156B2

(12) United States Patent
Takeda et al.

(10) Patent No.: US 8,605,156 B2
(45) Date of Patent: Dec. 10, 2013

(54) CALIBRATION TARGET DETECTION APPARATUS, CALIBRATION TARGET DETECTING METHOD FOR DETECTING CALIBRATION TARGET, AND PROGRAM FOR CALIBRATION TARGET DETECTION APPARATUS

(75) Inventors: Shoko Takeda, Kariya (JP); Kazuya Watanabe, Anjo (JP); Tadashi Asano, Kariya (JP); Yukiko Donishi, Kariya (JP); Kinji Yamamoto, Kariya (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 86 days.

(21) Appl. No.: 13/265,103

(22) PCT Filed: Feb. 18, 2010

(86) PCT No.: PCT/JP2010/052448
§ 371 (c)(1),
(2), (4) Date: Oct. 18, 2011

(87) PCT Pub. No.: WO2010/137364
PCT Pub. Date: Dec. 2, 2010

(65) Prior Publication Data
US 2012/0033087 A1    Feb. 9, 2012

(30) Foreign Application Priority Data

May 27, 2009 (JP) ................. 2009-128206

(51) Int. Cl.
*H04N 17/00* (2006.01)
*H04N 17/02* (2006.01)
*G06K 7/00* (2006.01)

(52) U.S. Cl.
USPC ............ 348/187; 348/175; 382/312

(58) Field of Classification Search
None
See application file for complete search history.

(56) References Cited

U.S. PATENT DOCUMENTS 5,940,531 A    8/1999    Watanabe et al.
6,137,893 A    10/2000    Michael et al.
(Continued)

FOREIGN PATENT DOCUMENTS

JP    9-153139 A    6/1997
(Continued)

OTHER PUBLICATIONS

International Search Report, PCT/JP2010/052448, dated May 11, 2010.
(Continued)

*Primary Examiner* — Jefferey Harold
*Assistant Examiner* — Sean Haiem
(74) *Attorney, Agent, or Firm* — Sughrue Mion, PLLC

(57) ABSTRACT

There is disclosed a calibration target detection apparatus that can be obtained at a low cost and without increasing storage capacity, is the apparatus being provided with: a light measurement region setting unit for setting a long light measurement region; a light-measuring unit for detecting light measurement information of the light measurement region; a profile generation unit for generating a first profile, wherein the long light measurement region taking a predetermined one direction as a long direction is scanned along the other direction orthogonal to the one direction, and the change in the light measurement information in the other direction is shown; and a second profile, wherein the long light measurement region taking the other direction as the long direction is scanned along the one direction, and the change in the light measurement information in the one direction is shown; and a position calculation unit for calculating, on the basis of a characteristic point of the first and second profiles, a position of a calibration target or a position of a predetermined location of the calibration target, the calibration target being used for calibrating an onboard camera, and the calibration target being included in a captured image acquired by the onboard camera.

20 Claims, 9 Drawing Sheets

(56) References Cited

U.S. PATENT DOCUMENTS

| | | | |
|---|---|---|---|
| 7,352,388 B2 * | 4/2008 | Miwa et al. | 348/187 |
| 2008/0036866 A1 * | 2/2008 | Sogawa et al. | 348/187 |
| 2008/0166072 A1 * | 7/2008 | Wang et al. | 382/312 |
| 2008/0181488 A1 | 7/2008 | Ishii et al. | |
| 2010/0245590 A1 * | 9/2010 | Cazier et al. | 348/175 |

FOREIGN PATENT DOCUMENTS

| | | |
|---|---|---|
| JP | 2007-253699 A | 10/2007 |
| JP | 2008-131177 A | 6/2008 |
| WO | 98/18117 | 4/1998 |
| WO | 02/077922 A1 | 10/2002 |
| JP | 09-189513 A | 7/1997 |

OTHER PUBLICATIONS

English Translation of International Preliminary Report on Patentablility for PCT/JP2010/052448 dated Dec. 22, 2011.

Extended European Search Report, dated May 10, 2013, issued in corresponding European Patent Application No. 10780324.9.

Oullet J-N, et al. "Developing assistant tools for geometric camera calibration: assessing the quality of input images", Pattern Recognition, 2004. ICPR 2004. Proceedings of the 17th International Conference on Cambridge, UK Aug. 23-26, 2004, Piscataway, NJ, IEEE, Los Alamitos, CA, vol. 4, Aug. 23, 2004, pp. 80-83.

Mallon et al. "Which pattern? Biasing aspects of planar calibration patterns and detection methods", Pattern Recognition Letters, Elsevier, Amsterdam, NL, vol. 28, No. 8, Mar. 19, 2007, pp. 921-930.

* cited by examiner

CALIBRATION TARGET DETECTION APPARATUS, CALIBRATION TARGET DETECTING METHOD FOR DETECTING CALIBRATION TARGET, AND PROGRAM FOR CALIBRATION TARGET DETECTION APPARATUS

CROSS REFERENCE TO RELATED APPLICATIONS

This application is a National Stage of International Application No. PCT/JP2010/052448 filed Feb. 18, 2010, claiming priority based on Japanese Patent Application No. 2009-128206 filed May 27, 2009, the contents of all of which are incorporated herein by reference in their entirety.

TECHNICAL FIELD

The present invention relates to a calibration target detection apparatus, a calibration target detecting method for detecting a calibration target, and a program for a calibration target detection apparatus.

BACKGROUND ART

Recent years have seen more vehicles in which a camera is mounted so that the driver of the vehicle can observe the side, rear, and other peripheral regions of the vehicle via an in-vehicle monitor. There are also apparatuses under development that carry out image processing or the like using a captured image acquired by the camera, and support parking and other driving operations. In such an apparatus, the camera for acquiring the captured image, which is the base for computing information used for positioning the vehicle and for other purposes, requires particularly high optical axis precision. Such a high optical axis precision is not easily obtained during mounting, and after the camera has been mounted, high precision can be achieved by calibrating the optical axis. In order to carry out such calibration, the calibration target used for calibration must be adequately detected. Art for detecting such a calibration target is disclosed in, e.g., Patent Document 1 cited below.

Patent Document 1 discloses an optical axis displacement detection apparatus for detecting displacement of the optical axis of the onboard camera mounted in the vehicle. This optical axis displacement detection apparatus detects a detection reference used when detecting optical axis displacement using template matching. More specifically, template matching is repeated while the template image of the detection reference is displaced from the center of the captured image, which includes the target image of the onboard camera, to the periphery. The position of the image matched to the template image in the captured image is specified as the position of the target image.

PRIOR ART DOCUMENTS

Patent Documents

[Patent Document 1] Japanese Laid-open Patent Application No. 2007-253699

DISCLOSURE OF THE INVENTION

Problems that the Invention is Intended to Solve

In the optical axis displacement detection apparatus described in Patent Document 1, the template image used in template matching must be stored in advance. It is preferred that the template image be stored at high resolution in order to perform template matching with good precision. Accordingly, the storage capacity for storing the template image is increased because the size of the template image is increased. Also, since the computational load related to template matching is increased, a high-performance computation processing device is required and costs are increased.

In view of the above problems, an object of the present invention is to provide a calibration target detection apparatus that can be implemented at low cost without increasing storage capacity; a calibration target detecting method for detecting a calibration target; and a program for the calibration target detection apparatus.

Means for Solving the Problems

A characterizing aspect of the calibration target detection apparatus of the present invention designed to solve the above-mentioned problems comprises: a light measurement region setting unit for setting a long light measurement region; a detection unit for detecting light measurement information of the light measurement region; a profile generation unit for generating a first profile, wherein the long light measurement region taking a predetermined one direction as a long direction is scanned along the other direction orthogonal to the one direction, and the change in the light measurement information in the other direction is shown; and a second profile, wherein the long light measurement region taking the other direction as the long direction is scanned along the one direction, and the change in the light measurement information in the one direction is shown; and a position calculation unit for calculating, on the basis of a characteristic point of the first and second profiles, a position of a calibration target or a position of a predetermined location of the calibration target, the calibration target being used for calibrating an onboard camera, and the calibration target being included in a captured image acquired by the onboard camera.

According to the above characterizing aspect, the storage capacity is not increased because a template image such as used in template matching is not required to be stored in advance. Here, the light measurement region is set in a common onboard camera and a function is provided for detecting the light measurement information of the light measurement region thus set. Accordingly, in accordance with the present aspect, the position of the calibration target or the position of a predetermined location of the calibration target can be specified on the basis of the characteristic point of the first profile and the second profile without providing a new function unit. Accordingly, it is possible to achieve a calibration target detection apparatus at a low cost.

The light measurement information of the light measurement region is preferably the luminance of the light measurement region.

According to the above characterizing aspect, change in the luminance can be readily detected from the first profile and the second profile because detection unit detects the luminance of the light measurement region. Therefore, the position of the calibration target can be readily specified on the basis of change in the luminance.

The light measurement information of the light measurement region is preferably the color information of the light measurement region.

According to the above characterizing aspect, change in the color can be readily detected from the first profile and the second profile because the detection unit detects the color information of the light measurement region. Therefore, the position of the calibration target can be readily specified on the basis of change in the color.

It is preferred that the calibration target have an angle with respect to a horizontal plane in the field of view of the onboard camera and to a perpendicular plane perpendicular to the horizontal plane; and a region partitioned by at least two straight lines that form an intersection be colored using a checkered pattern.

According to the above characterizing aspect, misdetection of the calibration target can be prevented because there are few similar shapes in the location when the onboard camera is calibrated. Also, the light measurement information changes dramatically at the boundary of the checkered pattern and the boundary is therefore readily detected. Accordingly, there is no requirement for a high-performance computation processing device because the computational load for detecting can be reduced. Therefore, the precision for detecting the calibration target is increased because the computational load is reduced, and a low-cost calibration target detection apparatus can be achieved.

The detection unit preferably adjusts exposure on the basis of a predetermined threshold value set in advance.

According to the above characterizing aspect, the difference in light measurement information can be made apparent. Therefore, the precision for detecting the calibration target can be increased.

The characteristic point is preferably at least one among an edge included in the first profile and the second profile, and a midpoint of two of the edges.

The use of a high-performance computation processing device is not required because the edge and the midpoint of the edge can be readily specified from the first profile and the second profile. A low-cost calibration target detection apparatus can therefore be achieved.

The region detected by the detection unit is preferably a calibration-target presence region, which is a portion of the captured image from the onboard camera.

According to the above characterizing aspect, the time required for light measurement can be reduced because light measurement is not required to be carried out for the entire range displayed as the finder image of the onboard camera. The computation processing load required for light measurement can be reduced. Therefore, a calibration target detection apparatus can be achieved at low cost because a detection unit that does not have high performance can be used.

The calibration-target presence region is preferably set on the basis of the mounting tolerance of the onboard camera.

According to the above characterizing aspect, the calibration target can be positioned inside the calibration-target presence region even if there is variability in the position of the calibration target inside the calibration-target presence region, in the case that the onboard camera is mounted in the vehicle in a predetermined error range set in advance in the factory or the like which mounts the onboard camera.

An aspect of the present invention designed to solve the above-mentioned problems is a calibration target detecting method comprising: a light measurement region setting step for setting a long light measurement region; a detection step for detecting light measurement information of the light measurement region; a profile generation step for generating a first profile, wherein the long light measurement region taking a predetermined one direction as a long direction is scanned along the other direction orthogonal to the one direction, and the change in the light measurement information in the other direction is shown; and a second profile, wherein the long light measurement region taking the other direction as the long direction is scanned along the one direction, and the change in the light measurement information in the one direction is shown; and a position calculation step for calculating, on the basis of a characteristic point of the first and second profiles, a position of a calibration target or a position of a predetermined location of the calibration target, the calibration target being used for calibrating an onboard camera, and the calibration target being included in a captured image acquired by the onboard camera.

According to this method, it is possible to reliably specify the position of a calibration target or to specify the position of a predetermined location of the calibration target without an increase in storage capacity in the same manner as the calibration target detection apparatus described above.

Also included in the scope of right in the present invention is a program advantageously used in the calibration target detection apparatus for detecting a calibration target, wherein a characterizing aspect of the program of the invention is that a computer is caused to execute: a light measurement region setting function for setting a long light measurement region; a detection function for detecting light measurement information of the light measurement region; a profile generation function for generating a first profile, wherein the long light measurement region taking a predetermined one direction as a long direction is scanned along the other direction orthogonal to the one direction, and the change in the light measurement information in the other direction is shown; and a second profile, wherein the long light measurement region taking the other direction as the long direction is scanned along the one direction, and the change in the light measurement information in the one direction is shown; and a position calculation function for calculating, on the basis of a characteristic point of the first and second profiles, a position of a calibration target or a position of a predetermined location of the calibration target, the calibration target being used for calibrating an onboard camera, and the calibration target being included in a captured image acquired by the onboard camera.

This program for a calibration target detection apparatus can obtain the same effects as those described above for the calibration target detecting method for detecting a calibration target, which is an aspect of the present invention described above, and can be provided with the various additional aspects described above.

BEST MODE FOR CARRYING OUT THE INVENTION

An embodiment of the present invention will be described in detail below. An onboard camera 20 mounted in a vehicle 100 is used for acquiring a rearward image of the vehicle 100 and is used for supporting traveling in reverse, and parking operation by a user, and other operations. Such a rearward image is acquired as a captured image by the onboard camera 20, and is also used in computation by image processing for obtaining the distance between the vehicle 100 and an obstacle contained in the captured image. However, when the optical axis of the onboard camera 20 is displaced from a setting value (e.g., a design value) set in advance, displacement will occur between the actual distance and the result obtained by computing the distance from the vehicle 100 to the obstacle. In such a state, a collision with the obstacle is liable to occur if the vehicle 100 is traveling on the basis of the computation. In view of the above, the optical axis is calibrated, e.g., in the factory after the onboard camera 20 has been mounted on the vehicle 100.

A calibration target detection apparatus 200 according to the present invention is used for specifying a position of a calibration target 10, which is used when the onboard camera 20 is calibrated in the factory. The description will proceed hereinbelow with reference to the drawings. Calibration of the onboard camera 20 in the present embodiment is not calibration carried out by modifying the physical position of the onboard camera 20 (the position in real space), but is rather calibration (correction) by computing the displacement of the optical axis of the onboard camera 20 on the basis of the difference between a setting value set in advance and the position or angle in which the onboard camera 20 is installed.

Figure 1:
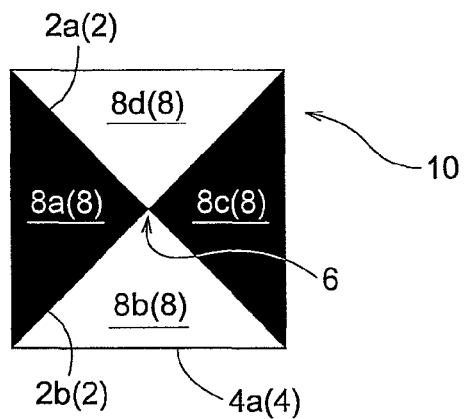
FIG. 1 is a diagram showing the calibration target according to the present embodiment.

FIG. 1 is a diagram showing the calibration target 10 according to the present embodiment. The calibration target 10 is composed of at least two straight lines 2 and an outer frame 4 formed in a substantially planar shape. In the present embodiment, the two or more straight lines 2a, 2b will be described as two straight lines. The outer frame 4 is a frame that surrounds the periphery of the two straight lines 2 described above and corresponds to a square 4a in the present embodiment. The two straight lines 2a and 2b inside the square 4a are arranged so as to have an angle with respect to a horizontal plane in the field of view of the onboard camera 20 and to a perpendicular plane perpendicular to the horizontal plane. The two straight lines 2 are arranged so as to form an intersection 6.

Although described in detail below, the calibration target detection apparatus 200 detects the light measurement information for each predetermined region by using a detection unit 21 of the onboard camera 20, and specifies the position of the calibration target 10 on the basis of differences in the light measurement information. The calibration target 10 that is used has a region 8 that is partitioned by the two straight lines 2 and is colored using a checkered pattern. In FIG. 1, the region 8 is partitioned into four regions 8A to 8D. These regions 8A to 8D are colored using a checkered pattern so that mutually adjacent regions have a different color, as shown in FIG. 1. The checkered pattern is not particularly limited, but it is advantageous to use a combination of colors that are sharply light and dark, such as a combination of black and white, or blue and red, for example. It is apparent that other color combinations are also possible. The calibration target 10 configured in the manner described above is configured so that the light measurement information is detected by the onboard camera 20 (i.e., by the detection unit 21 of the onboard camera 20), as described above. Accordingly, the calibration target 10 is configured having a size adequate for the detection unit 21 of the onboard camera 20 to be able detect light measurement information. For example, it is advantageous for the length of one side of the square 4a for calibrating the outer frame 4 to be about 400 mm.

Figure 2:
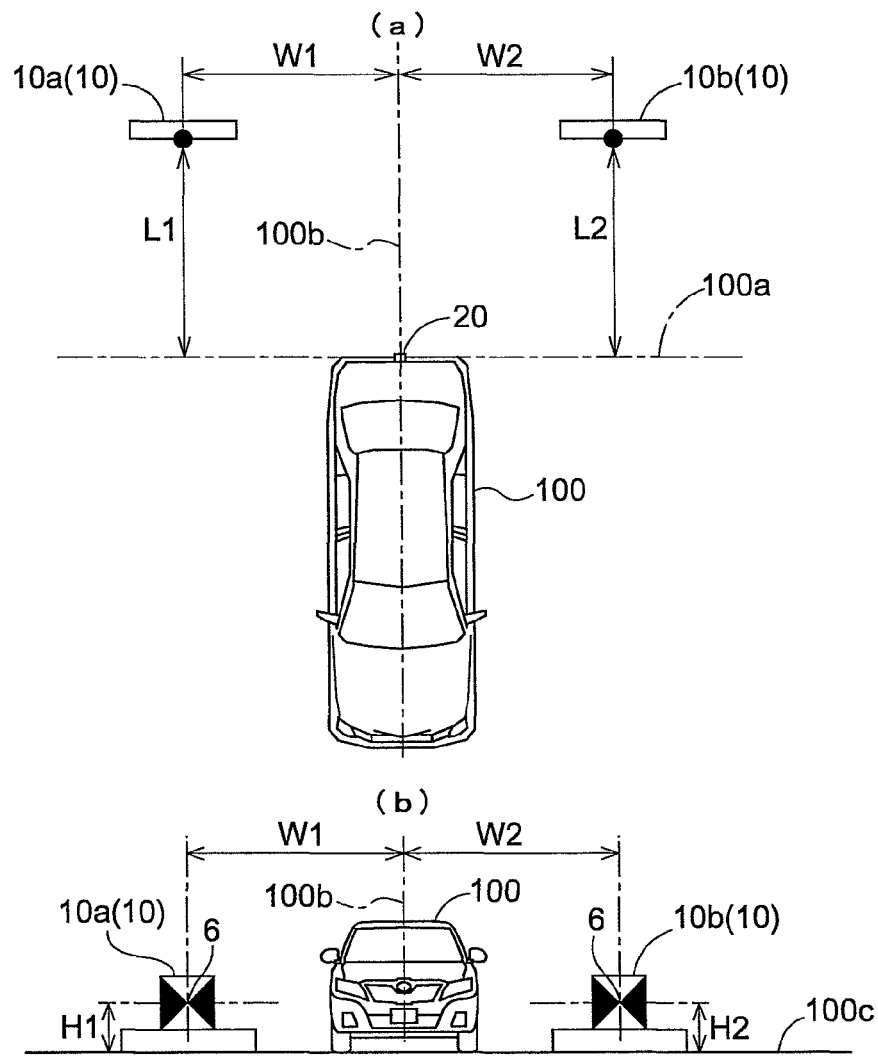
FIG. 2 is a diagram showing the positional relationship between the vehicle and the calibration target.

Next, the calibration method of the onboard camera 20 using the calibration target 10 according to the present embodiment will be described. FIG. 2(a) is a bird's-eye view showing the positional relationship between the vehicle 100 and the calibration target 10. FIG. 2(b) is an elevation view showing the position relationship between the vehicle 100 and the calibration target 10. Here, the onboard camera 20, which is to be calibrated in the present embodiment, is a rearview camera for capturing the rear area of the vehicle 100. Such an onboard camera 20 is installed in the vicinity of the license plate provided to the external rear part of the vehicle 100 or in the emblem vicinity or the like provided to the external rear part of the vehicle 100, as shown in FIG. 2. The ratio of the sizes of the vehicle 100 and the calibration target 10 in FIG. 2 have been ignored in the drawing in order to more clearly show the calibration target 10 according to the present invention.

A pair of calibration targets 10 is disposed at a distance away from and facing the onboard camera 20. In other words, two calibration targets are disposed in the field of view of the onboard camera 20, as shown in FIGS. 2(a) and 2(b). These calibration targets 10 are a pair of calibration targets 10a, 10b, which are disposed in a virtual plane so that the orthogonal distances from the rear end surface 100a of the vehicle 100 are predetermined distances L1, L2. For example, it is advantageous to use a screen-like arrangement. The calibration targets 10a, 10b are disposed at a distance from each other. The centers of the calibration targets 10a, 10b in the present embodiment are disposed at distances W1, W2 from the center line 100b of the vehicle 100. The centers of the calibration targets 10a, 10b (intersection 6) are furthermore disposed at distances H1, H2 from the floor surface 100c on which the vehicle 100 is parked.

The calibration targets 10a, 10b are disposed in the manner described above when the onboard camera 20 is calibrated. The calibration targets may be disposed so that W1 and W2, L1 and L2, and H1 and H2 all have the same value, or so that each has a different value. Detection is possible without misdetections when the onboard camera 20 is calibrated with the use of such a calibration target 10.

Figure 3:
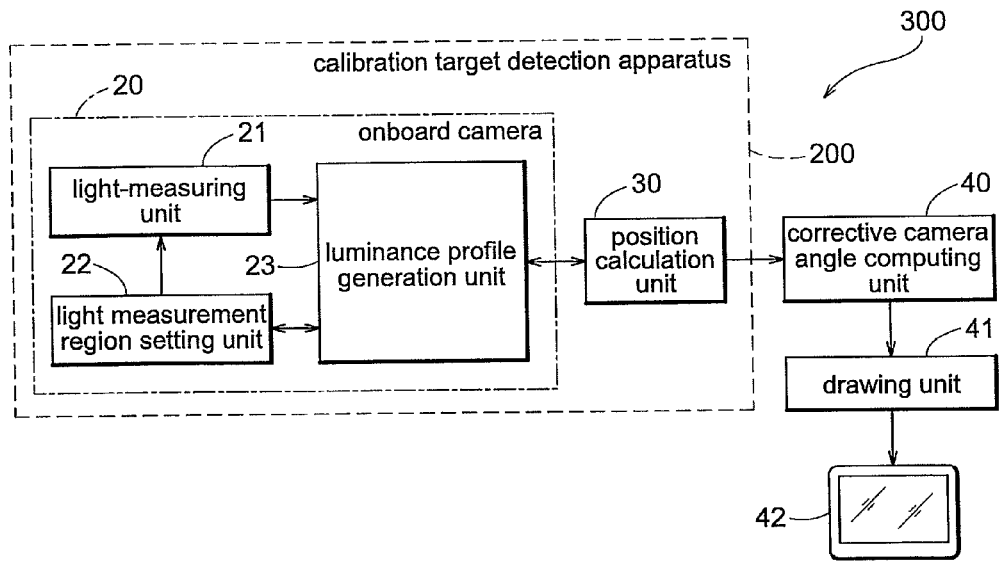
FIG. 3 is a block diagram schematically showing the calibration target detection apparatus according to the present embodiment, and the calibration apparatus of an onboard camera that calibrates the onboard camera using a calibration target specified by the calibration target detection apparatus.

Here, in the present embodiment, the light measurement information described above corresponds to the luminance. In other words, the light measurement information of a light measurement region RM corresponds to the luminance of the light measurement region RM. Accordingly, in the present embodiment, the detection unit 21 described above will be described as being the light-measuring unit 21. FIG. 3 is a block diagram schematically showing the configuration of the calibration target detection apparatus 200 according to the present embodiment, and the calibration apparatus 300 of an onboard camera that calibrates the onboard camera 20 using a calibration target 10 detected by the calibration target detection apparatus 200. The calibration target detection apparatus 200 is composed of the onboard camera 20 and a position calculation unit 30. The onboard camera 20 is provided with the following function units: the light-measuring unit 21, a light measurement region setting unit 22, and a luminance profile generation unit 23 (corresponding to the profile generation unit of the present invention). The calibration apparatus 300 is configured having the calibration target detection apparatus 200, a corrective camera angle computing unit 40, a drawing unit 41, and a display 42. In the calibration apparatus 300 having a calibration target detection apparatus 200 configured in this manner, the above-described function units for performing various processes for calibrating the onboard camera 20 may be assembled using hardware or software, or both using a CPU as a core member.

As described above, the light-measuring unit 21, the light measurement region setting unit 22, and the luminance profile generation unit 23 are mounted in the onboard camera 20. The light measurement region setting unit 22 sets a long light measurement region RM. The light measurement region RM is a region in which the luminance is measured, and is set within the field of view of the onboard camera 20. The light measurement region RM is set to be long and is set by coordinates that correspond to being within the field of view of the onboard camera 20. The field of view in the present embodiment corresponds to the range displayed as the finder image captured by the onboard camera 20 in a finder mode. The corresponding coordinate is specifically two points on a diagonal line of the light measurement region RM (e.g., a first coordinate and a second coordinate), and light measurement region setting unit 22 sets the first and second coordinates set in the field of view. The two coordinates set in this manner are transmitted to the later-described light-measuring unit 21. The light measurement region RM set by the light measurement region setting unit 22 is not fixed in a specific position in the field of view of the onboard camera 20 and can be reset to another position in the case that two coordinates a newly specified.

The light measurement region setting unit 22 can be configured using a central processing unit (CPU), an electronic control unit (ECU), or the like provided to the light measurement region setting unit 22. In the present embodiment, two calibration targets 10a, 10b are used in the manner shown in FIG. 2. Therefore, the light measurement region setting unit 22 sets a light measurement region RM that corresponds to the calibration targets 10a, 10b in the case that the luminance of the calibration targets 10a, 10b is to be measured.

The detection unit 21 detects the light measurement information of the light measurement region RM. In other words, the light-measuring unit 21 measures the luminance of the light measurement region RM. The light measurement region RM, which is the photometric target of the detection unit 21, is set by the light measurement region setting unit 22 described above. Luminance is an index that indicates the level of brightness (darkness). Therefore, the luminance of the light measurement region RM indicates the brightness (darkness) of the region set by the light measurement region setting unit 22. The brightness of the region may be obtained by, e.g., using a simple average of the brightness in the region, or using a weighted average. In the present embodiment, the light-measuring unit 21 corresponds to a photometer provided to the onboard camera 20. The calibration target detection apparatus 200 can therefore be provided at low cost because a new function unit having a light measurement function is not required to be provided.

The light-measuring unit 21 preferably adjusts exposure on the basis of a predetermined threshold value set in advance. Such a configuration is particularly effective in the case that the location where light measurement is to be performed is dark. In other words, in a case where the location where light measurement is to be performed in dark, the exposure is adjusted so that luminance at or greater than the predetermined threshold value set in advance becomes even greater. The exposure may be adjusted so that luminance less than the predetermined threshold value set in advance decreases. The luminance measured by the light-measuring unit 21 is thus transmitted to the later-described luminance profile generation unit 23.

The luminance profile generation unit 23 generates a first luminance profile (corresponding to the first profile of the present invention). The first luminance profile is a profile wherein the long light measurement region RM taking a predetermined one direction as a long direction is scanned along the other direction orthogonal to the one direction, and the change in the luminance in the other direction is shown. In the present embodiment, the predetermined one direction is a vertical direction. The other direction orthogonal to the one direction is a horizontal direction. The long direction is a long longitudinal direction. The first luminance profile in the present embodiment therefore corresponds to a profile that shows change in the luminance in the horizontal direction, the luminance having been obtained by scanning the long light measurement region RM along the horizontal direction, with the vertical direction being used as the longitudinal direction. Unless otherwise noted in the description below, the one direction is the vertical direction and the other direction is the horizontal direction.

In this manner, the light measurement region RM is scanned in the horizontal direction when the first luminance profile is to be generated. Therefore, the light measurement region setting unit 22 sets the light measurement region RM by sequentially shifting the coordinates along the horizontal direction. As described above, the light measurement region RM is set in an elongated shape in which the vertical direction is the longitudinal direction. In this case, the length of the light measurement region RM in the longitudinal direction is set so to be greater than the length in the vertical direction of the detection region (in the present embodiment, a later-described calibration-target presence region F), which is the target of detection for at least the luminance. The position of the light measurement region RM set in this manner is sequentially modified, and the luminance obtained by light measurement at each position modification is formed into a graph to produce the first luminance profile.

The luminance profile generation unit 23 also generates a second luminance profile (corresponding to the second profile of the present invention). In the present embodiment, the second luminance profile is generated after the first luminance profile described above has been acquired. The second luminance profile is a profile wherein the long light measurement region RM taking the other direction as the long direction is scanned along the one direction, and the change in the light measurement information in the one direction is shown. As described above, in the present embodiment, the one direction is a vertical direction, and the other direction is a horizontal direction. The second luminance profile in the present embodiment therefore corresponds to a profile that shows change in the luminance in the vertical direction, the luminance having been obtained by scanning the long light measurement region RM along the vertical direction, with the horizontal direction being used as the longitudinal direction.

Thus, the light measurement region RM is scanned in the vertical direction in the case that the second luminance profile is to be generated. Therefore, the light measurement region setting unit 22 sets the light measurement region RM by sequentially shifting the coordinates along the vertical direction. As described above, the light measurement region RM is set in an elongated shape in which the horizontal direction is the longitudinal direction. In this case, the length of the light measurement region RM in the longitudinal direction is set so as to be greater than the length in the horizontal direction of the detection region (in the present embodiment, a later-described calibration-target presence region F), which is the target of detection for at least the luminance. The position of the light measurement region RM set in this manner is sequentially modified, and the luminance obtained by light measurement at each position modification is formed into a graph to produce the second luminance profile.

The luminance profile generation unit 23 for generating the first and second profiles can be configured using a digital signal processor (DSP) provided to the onboard camera 20. In the present embodiment, two calibration targets 10a, 10b are used as shown in FIG. 2. The luminance profile generation unit 23 therefore generates first and second profiles of each of the calibration targets 10a, 10b.

When the luminance obtained by light measurement from the light-measuring unit 21 is transmitted to the luminance profile generation unit 23, a signal indicating as much is transmitted to the light measurement region setting unit 22. When the signal is transmitted to the light measurement region setting unit 22, the light measurement region RM is set again. The luminance can be measured while the position of the light measurement region RM is sequentially modified.

The position calculation unit 30 calculates the position of the calibration target 10 that is contained in the captured image acquired by the onboard camera 20 and that is used for calibrating the onboard camera 20 on the basis of the characteristic point of the first and second profiles. The first and second profiles are generated and stored by the luminance profile generation unit 23 described above. The captured image acquired by the onboard camera 20 is a finder image captured by the onboard camera 20 in a finder mode. Accordingly, in the present embodiment, the captured image is acquired so that the calibration target 10 used for configuring of the onboard camera 20 is contained in the finder image. The position calculation unit 30 refers to the first and second profiles stored by the luminance profile generation unit 23, extracts the characteristic point of each profile, and calculates the position of the calibration target 10.

The characteristic point corresponds to at least one among the edge and a midpoint of two edges contained in the first profile and the second profile. The characteristic of the calibration target 10 is known at the time that the onboard camera 20 is calibrated. This is because when the onboard camera 20 is to be calibrated, the calibration target 10 used in the calibration is selected in advance and disposed in a position such as that shown in FIG. 2. The position calculation unit 30 uses the edge of the first luminance profile and the second luminance profile as a characteristic point in the case that the characteristic of the calibration target 10 is a boundary between lines. The position calculation unit 30 uses the midpoint of the two edges of the first luminance profile and the second luminance profile as the characteristic point in the case that the characteristic point of the calibration target 10 is an intermediate point between lines. It is apparent that it is also possible to use a mode in which the characteristic point is extracted using the edge as well as the midpoint of two edges, or a mode in which the characteristic point is extracted using mutually difference methods for the first luminance profile and the second luminance profile. The characteristic of the 10 is set in advance by the user and is stored in, e.g., the position calculation unit 30.

The position calculation unit 30 calculates the position of the calibration target 10 on the basis of the characteristic point of the calibration target 10 described above. In the present embodiment, two calibration targets 10a, 10b are used as shown in FIG. 2. Therefore, the position calculation unit 30 calculates the position of both calibration targets 10a, 10b. The position of the calibration target 10 calculated by the position calculation unit 30 is transmitted to a later-described corrective camera angle computing unit 40. The position of the two calibration targets 10a, 10b shown in FIG. 2 is specified when the onboard camera 20 is to be calibrated. The calibration target detection apparatus 200 according to the present invention detects the calibration target 10 in this manner and specifies the position thereof.

The corrective camera angle computing unit 40 computes corresponding points that correspond to the left and right calibration targets 10a, 10b on a virtual image from the known set values of the mounting position of the onboard camera 20 and the mounting angle of the onboard camera 20 and from the position in which the calibration targets 10a, 10b are disposed; and computes the corrective camera parameter from the difference between the calibration targets 10a, 10b (particularly the intersection 6 of each calibration target) calculated by the position calculation unit 30 described above. The corrective camera parameter refers to the difference between a design value and an actual value in the camera parameter. Therefore, the design value in the corrective camera parameter is corrected to the actual value.

The corrective camera angle for correcting displacement of the optical axis produced when the onboard camera 20 is mounted in the vehicle 100 is computed on the basis of the pair of calibration targets 10a, 10b contained in the captured image and a pair of setting points which corresponds to a pair of calibration points (e.g., the pair of intersections 6) set from the pair of calibration targets 10a, 10b and which is set in advance in accordance with the mounting position of the onboard camera 20. The pair of setting points, which corresponds to a pair of calibration points set from the pair of calibration targets 10a, 10b and which is set in advance in accordance with the mounting position of the onboard camera 20, corresponds to a pair of corresponding points that correspond to left and right calibration points on a virtual screen. The difference between the pair of corresponding points and the pair of calibration points is computed and the corrective camera angle for correcting displacement of the optical axis produced when the onboard camera 20 is mounted in the vehicle 100 is computed.

The corrective camera angle is used for correcting the angle of the onboard camera 20. In this case the corrective camera angle is advantageously used when the captured image acquired by the onboard camera 20 is displayed on the display 42 and the drawing unit 41 superimposes a predetermined drawing on the captured image (e.g., a predicted line of travel for predicting the line of travel of the vehicle 100 in a known parking support device, a driving support device, or the like for supporting the driving of the driver when the vehicle 100 is parked in a parking space, or travels in reverse). In other words, when the image captured by the onboard camera 20 and the drawing drawn from design values are superimposed in the case that the angle of the onboard camera 20 is displaced from the design values, the captured image and the drawing are displaced and the driver is liable to make a perceptual error. In such a case, the drawing is corrected so as to match the actual captured image (the image captured by the onboard camera 20 installed at a camera angle displaced from design values) on the basis of the corrective camera angle. It is therefore possible to accurately superimpose the predetermined drawing on the captured image acquired by the onboard camera 20.

The corrective camera angle can also be used for computing the angle for correcting the angle of the onboard camera 20 to correct the captured image. The angle of the onboard camera 20 corresponds to the angle of the onboard camera 20 along the vertical direction of the lens of the onboard camera 20 (rotational angle), the angle of the onboard camera 20 in the vertical direction (elevation angle), and the angle of the onboard camera 20 in the horizontal direction (azimuth angle). In such a case, the angle for correcting the angle of the onboard camera 20 described above is composed of a rotational angle (roll angle) for correcting the angle of the onboard camera 20 along the vertical direction of the lens of the onboard camera 20, an elevation angle (tilt angle) for correcting the angle of the onboard camera 20 in the vertical direction, and an azimuth angle (pan angle) for correcting the angle of the onboard camera 20 in the horizontal direction; and the angles of the onboard camera 20 can be corrected when the corrective camera angle is used.

Figure 4:
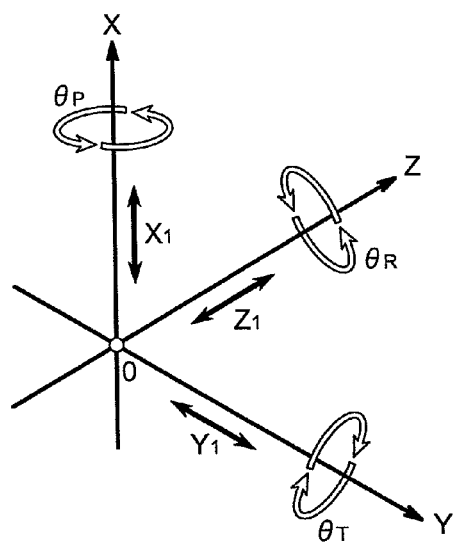
FIG. 4 is a diagram showing the displacement of the onboard camera.

Here, the onboard camera 20 is disposed in the center O with the vertical direction of the lens of the onboard camera 20 facing in the Z-axis direction in, e.g., a coordinate system composed of an X-axis, a Y-axis, and a Z-axis such as that shown in FIG. 4. In such a case, the roll angle corresponds to the rotational angle for correcting the angle ($\theta_R$) about the Z-axis in FIG. 4. The tilt angle corresponds to the angle used for correcting the angle ($\theta_T$) about the Y-axis in FIG. 4. The pan angle corresponds to the angle used for correcting the angle ($\theta_P$) about the X-axis in FIG. 4.

Therefore, the captured image captured by the onboard camera 20 is rotated (planar rotation) in accordance with the roll angle, the captured image rotated in accordance with the roll angle is adjusted for elevation in accordance with the tilt angle, and the angle in the horizontal direction is adjusted in accordance with the pan angle. The use of such angles makes it possible to accurately superimpose the predetermined drawing on the captured image as described above, and to also minimize variability in the capture range of each product. Thus, in accordance with the calibration apparatus 300, the displacement in the optical axis produced when the onboard camera 20 is mounted in the vehicle 100 can be advantageously calibrated (corrected) by making use of the position of the calibration target 10 specified by the calibration target detection apparatus 200 according to the present invention.

As another application example apart from correcting a predetermined drawing, it is also possible to correct and display on the display 42 the captured image itself as acquired by the onboard camera 20, by using the rotational angle, elevation angle, and the azimuth angle for correcting the angle of the onboard camera 20. Alternatively, it is also possible to use the position of a display object (e.g., a lane marker, a physical object, or the like) contained in the captured image acquired by the onboard camera 20, in order to specify a precise position by performing a correction using the rotational angle, elevation angle, and the azimuth angle for correcting the angle of the onboard camera 20.

It is apparent that in addition to the rotational angle, elevation angle, and azimuth angle for correcting the angle of the onboard camera 20, it is also possible to correct the position of the onboard camera 20 along the X-, Y-, and Z-axes indicated by the solid black arrows $X_1, Y_1$, and $Z_1$ in FIG. 4 in the case that the onboard camera 20 is not disposed in the center O.

In this case, the light measurement region setting unit 22 sets the light measurement region RM, for which the light-measuring unit 21 performs light measurement, in an elongated shape, as described above. In the present embodiment, the light measurement region setting unit 22 does not set the region in which light measurement is carried out along the entire capture range that can be captured by the onboard camera 20. The light measurement region setting unit 22 sets the region inside the region F in which the calibration target 10 is predicted to be present, on the basis of the known mounting position of the onboard camera 20, the setting value of the mounted angle of the onboard camera 20, the position in which the calibration targets 10a, 10b are disposed, and the variability of the mounting angle of the onboard camera 20. Detection of the calibration target 10 by the onboard camera 20 is described in detail below.

Figure 5:
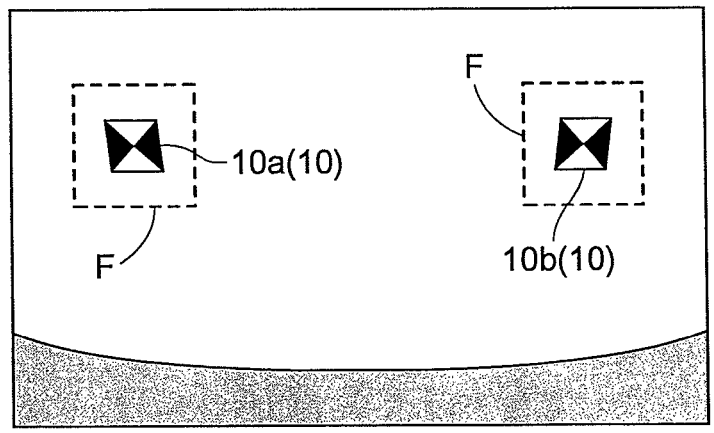
FIG. 5 is a diagram showing the calibration-target presence region.
Figure 6:
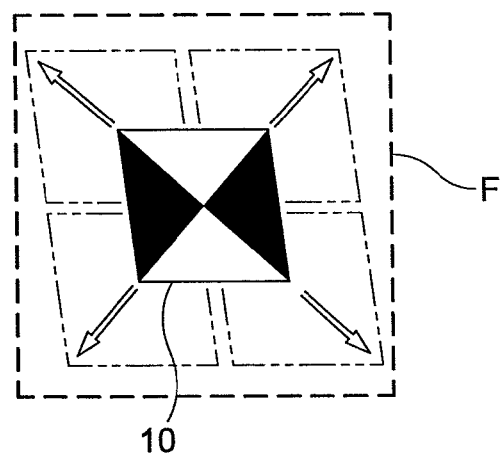
FIG. 6 is a diagram showing the variability of the calibration target in the calibration-target presence region.

When the calibration of the onboard camera 20 is started by the calibration apparatus 300, the onboard camera 20 captures scenery such as that shown in FIG. 5 as a finder image. The calibration targets 10a, 10b are present in the calibration-target presence region F, as shown in FIG. 5. This is due to the fact that the calibration-target presence region F is set on the basis of the mounting tolerance of the onboard camera 20 (with consideration given to the mounting tolerance or the like of the onboard camera 20). Therefore, the calibration targets 10a, 10b are positioned inside the calibration-target presence region F even if there is variability in the position inside the calibration-target presence region F, as shown in the white arrows in FIG. 6, in the case that the onboard camera 20 has been mounted in the vehicle 100 in the factory or the like within a predetermined error range set in advance.

The region for detection (region to be scanned) by the light-measuring unit 21 may be the calibration-target presence region F, which is a portion of the captured image of the onboard camera 20. In other words, the light measurement region RM in which the light-measuring unit 21 is to carry out light measurement may be within the calibration-target presence region F only. Therefore, the light measurement region setting unit 22 sets the light measurement region RM so that the light-measuring unit 21 can scan and measure light within the calibration-target presence region F. The use of such a configuration makes it possible to reduce the time required for light measurement because light measurement is not required to be carried out along the entire range displayed as the finder image of the onboard camera 20; and it is also possible to reduce the computation processing load required for light measurement. A calibration target detection apparatus can be achieved at low cost because a light-measuring unit 21 that does not have high performance can be used.

Figure 7:
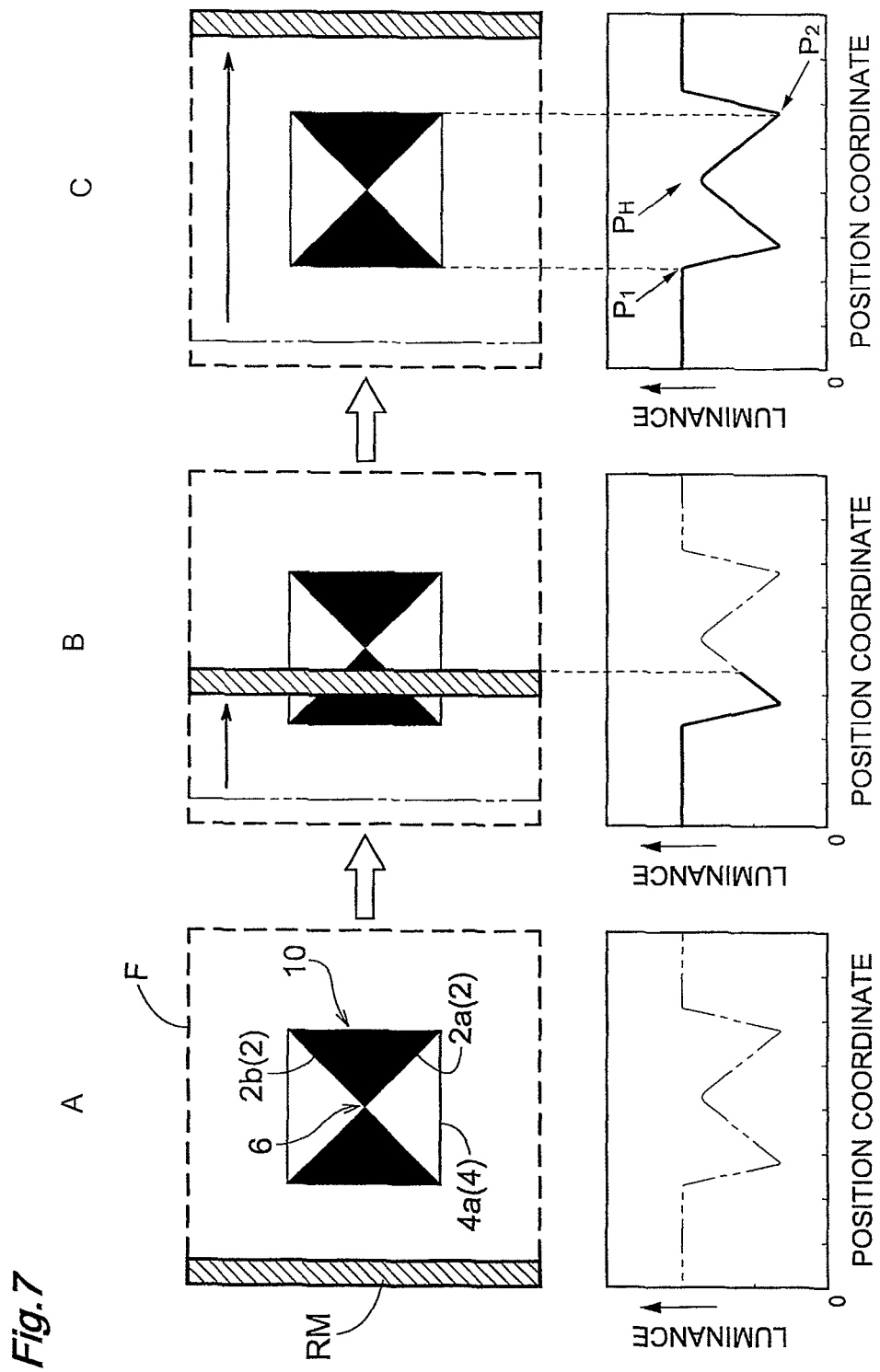
FIG. 7 is a diagram showing the relationship between the calibration-target presence region, the light measurement region, and the first luminance profile.

Next, the light measurement performed by the light-measuring unit 21 will be described. As described above, the light measurement region setting unit 22 sets the light measurement region RM so that the light-measuring unit 21 scans and measures the light inside the calibration-target presence region F. The light measurement region setting unit 22 sets the light measurement region RM so that the calibration-target presence region F is scanned in the horizontal direction, as shown in FIG. 7. The light measurement region RM is set to be a long light measurement region RM in which the vertical direction is the longitudinal direction in the case that the light-measuring unit 21 scans along the horizontal direction. In this case, the length of the light measurement region RM in the vertical direction is set to be at least equal to or greater than the length of the calibration-target presence region F in the vertical direction. The length of the light measurement region RM in the horizontal direction is set in accordance with the resolution of the onboard camera 20, and is more specifically set in terms of the number of pixels. For example, in the case that the calibration-target presence region F shown in FIG. 7 is a region measuring 100 pixels by 100 pixels, the length in the vertical direction is set to be 100 pixels and the length in the horizontal direction is set to be eight pixels.

The light-measuring unit 21 measures the luminance of the light measurement region RM thus set by the light measurement region setting unit 22. In the present embodiment, the light-measuring unit 21 does not measure the luminance of the captured image captured and stored by the onboard camera 20, but rather measures the luminance when the onboard camera 20 is in a finder mode. Therefore, the captured image captured using the finder function is only displayed when the luminance is being measured.

The light measurement region setting unit 22 sets the next light measurement region RM to undergo light measurement when the light-measuring unit 21 ends light measurement of the luminance of the light measurement region RM thus set (e.g., the light measurement region RM shown in FIG. 7A). In this case, the length of the light measurement region RM thus set in the vertical direction is set to be equal to or greater than the length of the calibration-target presence region F in the vertical direction in the same manner as FIG. 7A. The position of the light measurement region RM in the horizontal direction is moved a single pixel from the position shown in FIG. 7A. The long light measurement region RM has therefore been slid and moved a single pixel in the horizontal direction. Change in the average luminance can be measured by setting the relocation distance of the sliding and moving to be at least the length in the horizontal direction (e.g., eight pixels) in the case that the light measurement region RM is slid and moved in the horizontal direction.

The terminal end of the calibration-target presence region F will be ultimately reached, as shown in FIG. 7C, by repeating a process in which the light measurement region setting unit 22 sets the light measurement region by sliding and moving the light measurement region a single pixel at a time and the light-measuring unit 21 measures the luminance (FIG. 7B shows this state at an intermediate point). Therefore, the light measurement region RM is scanned in the horizontal direction and change in the luminance in the horizontal direction can be acquired. Change in the luminance thus acquired is transmitted to the luminance profile generation unit 23, and a first luminance profile showing the change in luminance in the horizontal direction is generated by the luminance profile generation unit 23. Such as first luminance profile is also shown in FIG. 7.

The perpendicular axis shows the intensity of the luminance, and the horizontal axis shows the step at which the measured luminance was acquired (corresponding to the position in the horizontal direction). In the calibration target 10 used in the present embodiment, the luminance is constant ($P_1$) at the start of light measurement because there is only a bright portion (white portion), as shown in FIG. 7C. The luminance is reduced from $P_1$ when the light measurement region RM reaches the calibration target 10 because the dark portion (black portion) rapidly increases. The luminance begins increasing and the shape becomes peak $P_H$ shape when the entire width of the light measurement region RM in the light measurement region RM completely overlaps the calibration target 10. The luminance is thereafter reduced until the light measurement region RM begins to move away from the calibration target 10. The luminance in this case is $P_2$. The luminance increases when the light measurement region RM begins to move away from the calibration target 10, and the luminance becomes a constant value when the light measurement region RM has moved away from the calibration target 10.

The position calculation unit 30 can specify the intersection 6 of the two straight lines 2a, 2b on the basis of peak $P_H$, which is the characteristic point from the first luminance profile. In the present embodiment, the light measurement region RM is provided with a width of eight pixels in the horizontal direction. Therefore, the peak $P_H$ is not obtained when the light measurement region RM has reached the intersection 6, but is rather obtained when the center part of the light measurement region RM in the horizontal direction has reached the intersection 6. The position calculation unit 30 specifies as the center point of the calibration target 10 the position halfway (four pixels in the present embodiment) back along the width of the light measurement region RM in the horizontal direction from the point (position coordinate) at which the peak $P_H$ was obtained. The calibration target 10 is specified as being positioned between the position at which the luminance is reduced from a constant value ($P_1$) and the position at which the luminance $P_2$ was measured.

When measurement of the luminance in the horizontal direction has been completed, the light measurement region setting unit 22 subsequently sets the light measurement region RM so as to move in the vertical direction, which is the direction orthogonal to the horizontal direction. FIG. 8A shows the state at the start of light measurement. The light-measuring unit 21 measures the luminance in accordance therewith. The length of the light measurement region RM in the vertical direction is set to be at least equal to or greater than the length of the calibration-target presence region F in the horizontal direction. The length of the light measurement region RM in the vertical direction is set to be several pixels (e.g., eight pixels) in the same manner as the scanning in the horizontal direction described above.

When the light measurement region setting unit 22 has finished setting the light measurement region RM and the light-measuring unit 21 has finished measuring the luminance in the light measurement region RM, the light measurement region RM is slid and moved in the vertical direction a single pixel at a time by the light measurement region setting unit 22 in the same manner as scanning in the horizontal direction described above, and the luminance is measured by the light-measuring unit 21. In the case that the light measurement region RM is slid and moved in the vertical direction in this manner, the displacement distance (e.g., a single pixel) by sliding and moving is set to be at least equal to or greater than the length in the vertical direction (e.g., eight pixels), whereby the average change in the luminance can be measured.

The setting of such a light measurement region RM and measurement of the luminance are continuously carried out as shown in FIG. 8B, until the terminal end in the vertical direction shown in FIG. 8C is ultimately reached. The change in luminance acquired in this manner is transmitted to the luminance profile generation unit 23, and a second luminance profile showing the change in luminance in the vertical direction is generated by the luminance profile generation unit 23.

Figure 8:
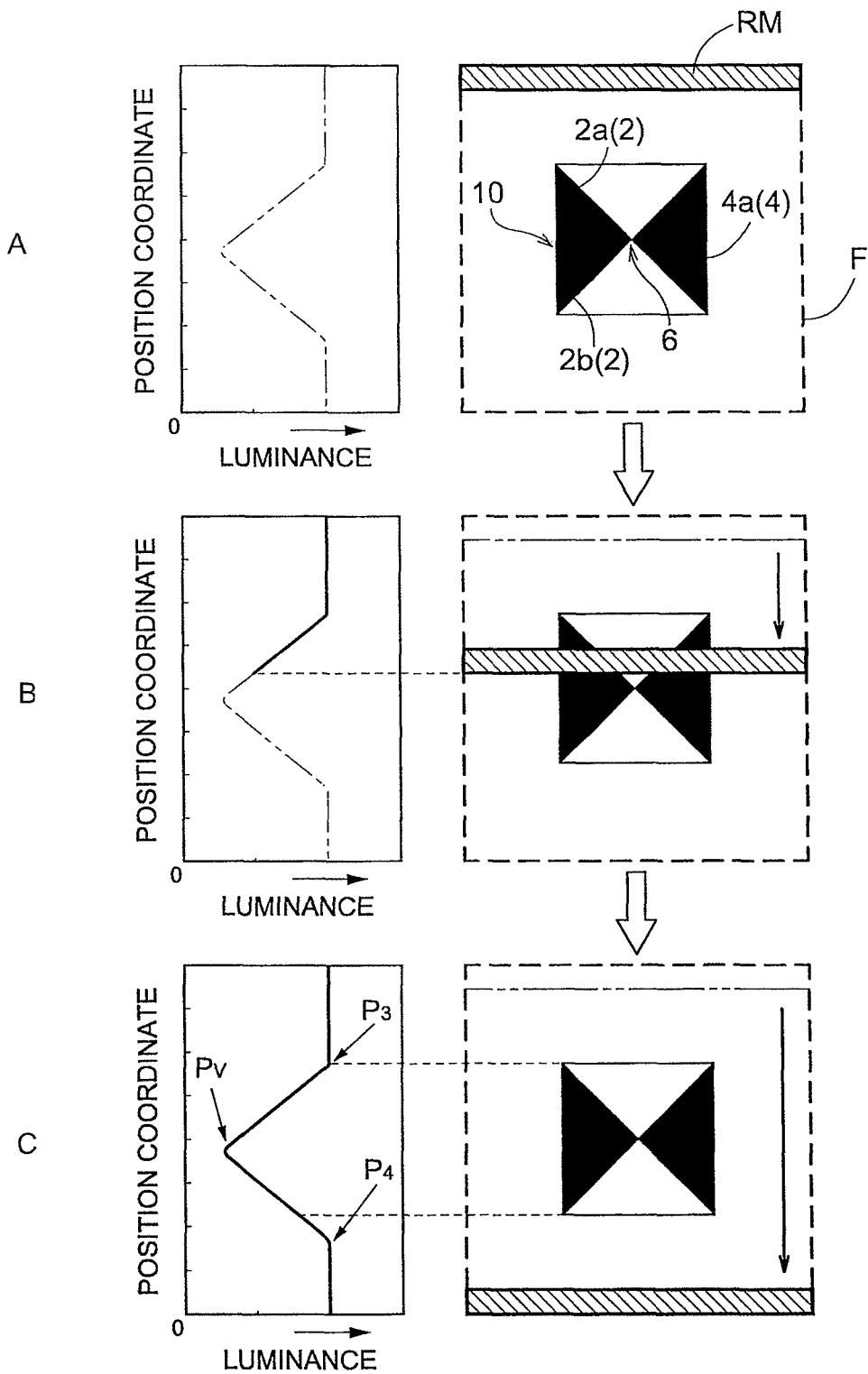
FIG. 8 is a diagram showing the relationship between the calibration-target presence region, the light measurement region, and the second luminance profile.

The second luminance profile generated in this manner is also shown in FIG. 8. The perpendicular axis shows the intensity of the luminance, and the horizontal axis shows the step at which the measured luminance was acquired (corresponding to the position in the perpendicular direction). The luminance is constant ($P_3$) at the start of light measurement because there is only a bright portion (white portion). The luminance is reduced from $P_3$ when the light measurement region RM reaches the calibration target 10 because the dark portion (black portion) gradually increases. The luminance begins decreasing together with the increase in the dark portion, and the luminance profile assumes a shape having peak $P_v$. The luminance increases thereafter and becomes a constant value ($P_4$) when the light measurement region RM has moved completely away from the calibration target 10.

The position calculation unit 30 can specify the intersection 6 of the two straight lines 2a, 2b on the basis of peak $P_v$, which is the characteristic point from the second luminance profile. In the present embodiment, the light measurement region RM is provided with a width of eight pixels in the vertical direction. Therefore, the peak $P_v$ is not obtained when the light measurement region RM has reached the intersection 6, but is rather obtained when the center part of the light measurement region RM in the vertical direction has reached the intersection 6. The position calculation unit 30 specifies as the center point of the calibration target 10 the position halfway (four pixels in the present embodiment) back along the width of the light measurement region RM in the vertical direction from the point (position coordinate) at which the peak $P_v$ was obtained. In the second luminance profile in the present embodiment, luminance becomes a constant value when the light measurement region RM has completely moved away from the calibration target 10 in the vertical direction. Therefore, the position eight pixels back from the position ($P_4$) at which the luminance again becomes a constant value corresponds to the end part of the calibration target 10. The position calculation unit 30 therefore specifies that the calibration target 10 is positioned between the position at which the luminance is reduced from a constant value ($P_3$) and the position eight pixels back from the position ($P_4$) at which the luminance again became a constant value.

Figure 9:
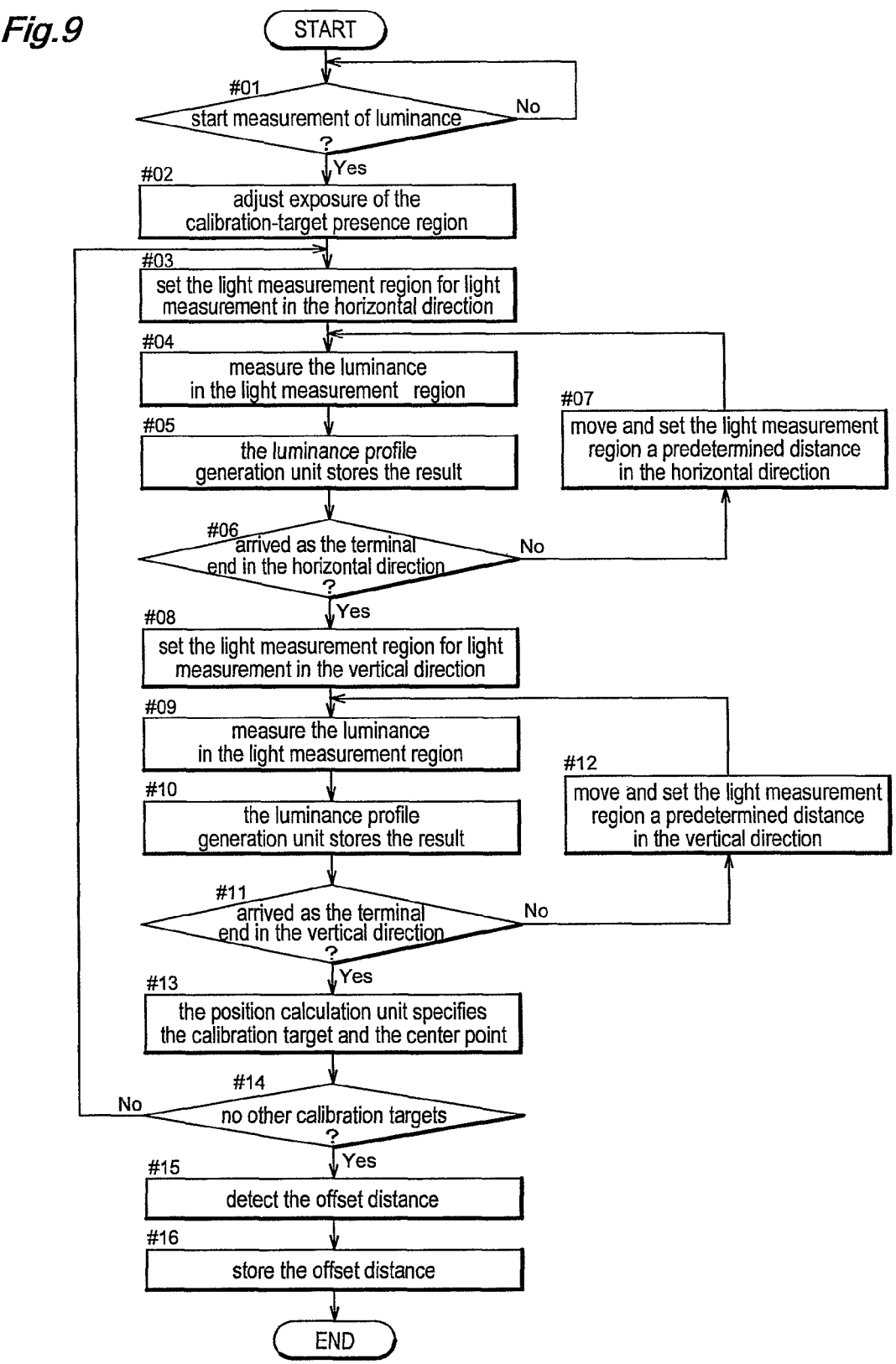
FIG. 9 is a flowchart showing the calibration target detection apparatus and the process for the calibration apparatus.

Next, the flow in which the calibration target detection apparatus 200 according to the present invention detects the calibration target 10 will be described with reference to the flowchart. FIG. 9 is a flowchart for detecting the calibration target 10 as performed by the calibration target detection apparatus 200. Shown in FIG. 9 is the flow according to the calibration apparatus 300 for calibrating the onboard camera 20 using the position of the calibration target 10 detected by the calibration target detection apparatus 200.

In the case that the measurement of the luminance is to be started (step #01: Yes), exposure of the calibration-target presence region F is adjusted (step #02). The exposure is adjusted in accordance with the brightness of the calibration-target presence region F and is adjusted so that the portion having a brightness that is equal to or greater than a predetermined threshold value set in advance becomes prominent. The light measurement region setting unit 22 sets the light measurement region RM for the horizontal direction (step #03). This light measurement region RM corresponds to the region in which the light-measuring unit 21 measures light, and is set as a long light measurement region RM. The step for setting the long light measurement region RM in this manner is referred to as the light measurement region setting step.

Next, the light-measuring unit 21 measures the luminance in the light measurement region RM (step #04). The step in which the light-measuring unit 21 measures (detecting) the luminance (light measurement information) of the light measurement region RM in this manner is referred to as the light measurement step (detection step). The luminance measured by the light-measuring unit 21 is transmitted to and stored by the luminance profile generation unit 23 (step #05). At this point, when the light measurement region RM undergoing light measurement has not reached the terminal end inside the calibration-target presence region F in the horizontal direction (step #06: No), the light measurement region setting unit 22 moves the light measurement region RM by a predetermined distance in the horizontal direction (step #07). Processing is then continued from step #04.

Conversely, when the light measurement region RM has arrived at the terminal end inside the calibration-target presence region F in the horizontal direction (step #06: Yes), light measurement in the horizontal direction is ended and processing related to light measurement in the vertical direction is started. First, the light measurement region setting unit 22 sets the light measurement region RM for the vertical direction (step #08). This light measurement region RM corresponds to the region in which the light-measuring unit 21 will perform light measurement and is set as a long light measurement region. The step for setting the long light measurement region RM in this manner is referred to as the light measurement region setting step.

Next, the light-measuring unit 21 measures the luminance inside the light measurement region RM (step #09). The step in which the light-measuring unit 21 measures (detects) the luminance (light measurement information) of the light measurement region RM is referred to as the light measurement step (detection step). The luminance measured by the light-measuring unit 21 is transmitted to and stored by the luminance profile generation unit 23 (step #10). At this point, when the light measurement region RM undergoing light measurement has not reached the terminal end inside the calibration-target presence region F in the vertical direction (step #11: No), the light measurement region setting unit 22 moves the light measurement region RM by a predetermined distance in the vertical direction (step #12). Processing is then continued from step #09.

Conversely, when the light measurement region RM has arrived at the terminal end inside the calibration-target presence region F in the vertical direction (step #11: Yes), light measurement in the vertical direction is ended. This processing generates a first luminance profile that shows change in luminance in the horizontal direction (first profile), and a second luminance profile that shows change in luminance in the vertical direction (second profile). This step for generating the first luminance profile and second luminance profile is referred to as the luminance profile generation step (profile generation step).

Next, the position calculation unit 30 calculates the position of the calibration target 10 and the intersection (center point) 6 thereof that are used for calibrating the onboard camera 20 and that are contained in the captured image acquired by the onboard camera 20, on the basis of the first luminance profile and second luminance profile (step #13). This step is referred to as the position calculation step. In this manner, the calibration target detection apparatus 200 according to the present invention specifies the position of the calibration target 10.

As long as there is another calibration target 10 in addition to the calibration target 10 for which the position has been calculated as described above (step #14: No), the process returns to step #03 and the position of the other calibration target 10 is calculated. On the other hand, if there is no other calibration target 10 (step #14: Yes), the calibration apparatus 300 of the onboard camera 20 detects the offset distance (step #15) on the basis of the position of the calibration target 10 specified by the calibration target detection apparatus 200. This offset distance corresponds to the rotational angle, elevation angle, and azimuth angle for correcting the angle of the camera 20, and the offset distance is stored in a predetermined storage unit (step #16). Processing is carried out in accordance with the flow described above.

[Other Embodiments]

In the embodiments described above, the calibration target 10 was described to have an angle with respect to the horizontal plane of the field of view of the onboard camera 20 and to the perpendicular plane which is perpendicular to the horizontal plane, and the region 8 partitioned by at least two straight lines 2 that form an intersection 6 was described as being colored in a checkered pattern. However, the range of application of the present invention is not limited thereby. For example, it is also possible to use a calibration target 10 in which the regions partitioned by a plurality of straight lines 2a to 2h, which do not have an angle with respect to the horizontal plane of the field of view of the onboard camera 20 and to the perpendicular plane which is perpendicular to the horizontal plane, are colored in a checkered pattern, as shown in FIG. 10.

Figure 10:
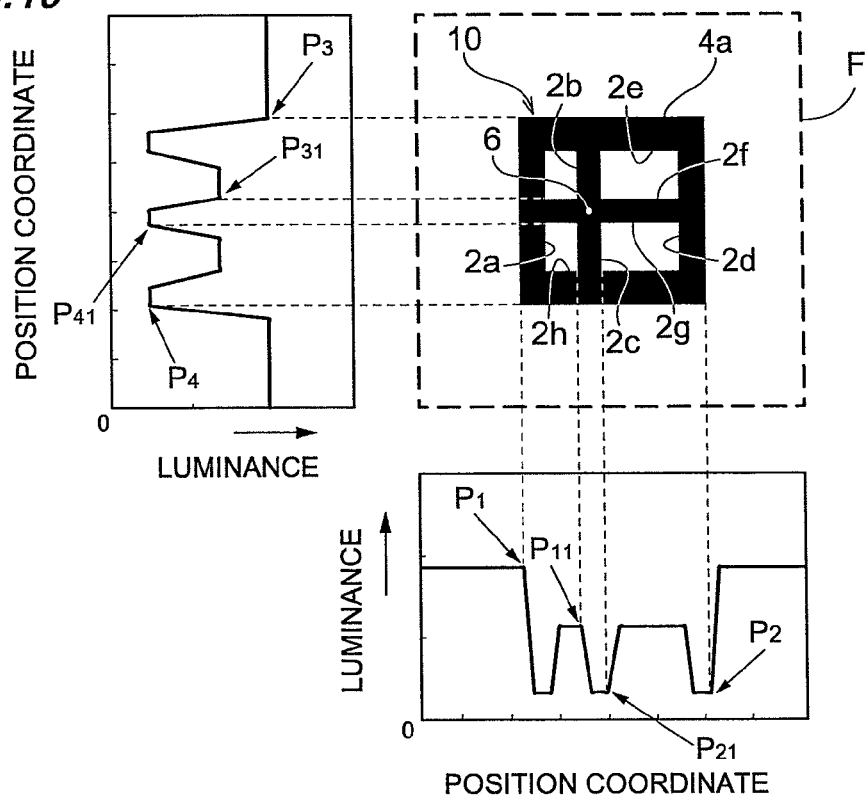
FIG. 10 is a diagram showing the calibration target and the luminance profile of another embodiment.

FIG. 10 shows the calibration target 10 according to another embodiment. The first luminance profile which shows change in the luminance in the horizontal direction in the lower part of the calibration target 10 and the second luminance profile which shows change in the luminance in the vertical direction in the left part of the calibration target 10. It is possible to advantageously generate a luminance profile even when the calibration target 10 is composed of a plurality of straight lines 2a to 2h, which do not have an angle with respect to the horizontal plane of the field of view of the onboard camera 20 and to the perpendicular plane which is perpendicular to the horizontal plane, as shown in FIG. 10. It can be specified from the first luminance profile shown in FIG. 10 that the calibration target 10 is positioned between the position at which the luminance is reduced from a constant value ($P_1$) and the position at which the luminance ($P_2$) was obtained prior to ultimately becoming a constant value. Also, it can be specified from the second luminance profile shown in FIG. 10 that the calibration target 10 is positioned between the position at which the luminance is reduced from a constant value ($P_3$) and the position at which the luminance ($P_4$) was obtained prior to ultimately becoming a constant value.

In the case that the calibration target 10 is to be used, it is possible to specify the center of the straight lines 2b, 2c, 2f, and 2g to be the center point 6 of the calibration target 10. In such a case, the center point of the two edges $P_{11}$ and $P_{21}$ in the first luminance profile is specified as the center of the straight lines 2b and 2c. Also, the center point of the two edges $P_{31}$ and $P_{41}$ in the second luminance profile is specified as the center of the straight lines 2f and 2g. The calibration target detection apparatus 200 according to the present invention is capable of advantageously detecting the calibration target 10 even when the calibration target is composed of a plurality of straight lines 2a to 2h, which do not have an angle with respect to the horizontal plane of the field of view of the onboard camera 20 and to the perpendicular plane which is perpendicular to the horizontal plane.

Figure 11:
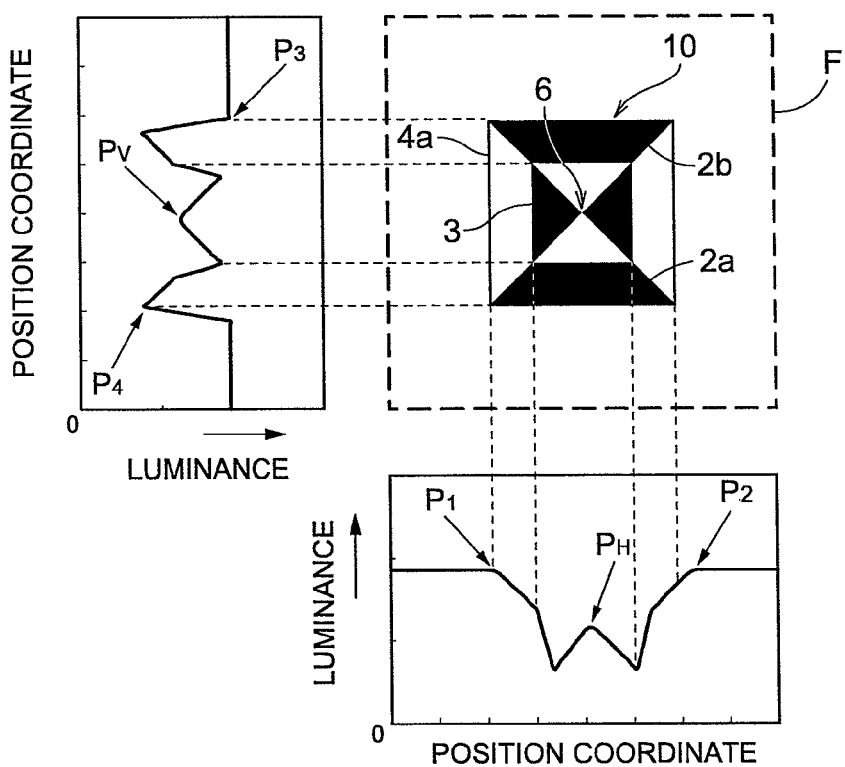
FIG. 11 is a diagram showing the calibration target and the luminance profile of another embodiment.

It is also possible to use a calibration target 10 composed of a square shape 3 and a plurality of straight lines 2a, 2b having an angle with respect to the horizontal plane of the field of view of the onboard camera 20 and to the perpendicular plane perpendicular to the horizontal plane, as shown in FIG. 11. FIG. 11 shows the first luminance profile which shows change in the luminance in the horizontal direction in the lower part of the calibration target 10 and the second luminance profile which shows change in the luminance in the vertical direction in the left part of the calibration target 10. The calibration target 10 is specified as being positioned between the position at which the luminance is reduced from a constant value ($P_1$) and the position back by a distance equal to the light measurement region RM from the position at which the luminance ultimately becomes a constant value ($P_2$). The calibration target 10 can be specified from the second luminance profile as being positioned between the position at which the luminance is reduced from a constant value ($P_3$) and the position at which the luminance ($P_4$) was obtained prior to ultimately becoming a constant value.

It is furthermore possible to specify that there is an intersection (center point) 6 of the calibration target 10 shown in FIG. 11 in the position returned by half of the width of the light measurement region RM (four pixels in the present embodiment) from the position in which the peak $P_H$ in the first luminance profile was obtained, and in the position that is returned by half of the width of the light measurement region RM (four pixels in the present embodiment) from the position in which the peak $P_v$ in the second luminance profile was obtained. Thus, it is possible to advantageously specify the position of the calibration target 10 and the intersection (center point) 6 even when the calibration target 10 is composed of a square shape 3 and two straight lines 2a, 2b. The square shape 3 may also be, e.g., a circle. It is possible to advantageously specify the position of the calibration target 10 and the intersection (center point) 6 (the position of a predetermined location on the calibration target 10) even with such a calibration target 10.

In the embodiment described above, the light measurement region setting unit 22 was described as being set so that the light measurement region RM slides and moves inside the calibration-target presence region F. In other words, with the calibration target 10 shown in FIG. 12, the measurement of the luminance in the horizontal direction is carried out in the range of X1 with Y1 being the elongated longitudinal direction, and the measurement of the luminance in the vertical direction in the range of Y1 is carried out with X1 being the elongated longitudinal direction. However, the range of application of the present invention is not limited thereby. It is possible for the position calculation unit 30 to specify the position of the calibration target 10 in the horizontal direction on the basis of first luminance profile which shows change in the luminance in the horizontal direction. In other words, in FIG. 12, the position calculation unit 30 can specify that the calibration target 10 is located in the range shown by X2 on the basis of the first luminance profile. Accordingly, it is also possible to perform calibration in the range of Y1 using X2 as the elongated longitudinal direction when the luminance is measured in the vertical direction after the luminance has been measured in the horizontal direction. In accordance with such a method, light measurement in unnecessary regions (regions outside X2 in the horizontal direction) is not required because it is possible to specify that the calibration target 10 is not present in a region outside of X2 in the horizontal direction in accordance with the first luminance profile generated by the earlier measurement of the luminance in the horizontal direction. It is therefore possible to reduce the computation processing load and to reduce the time required for detecting the calibration target 10.

Figure 12:
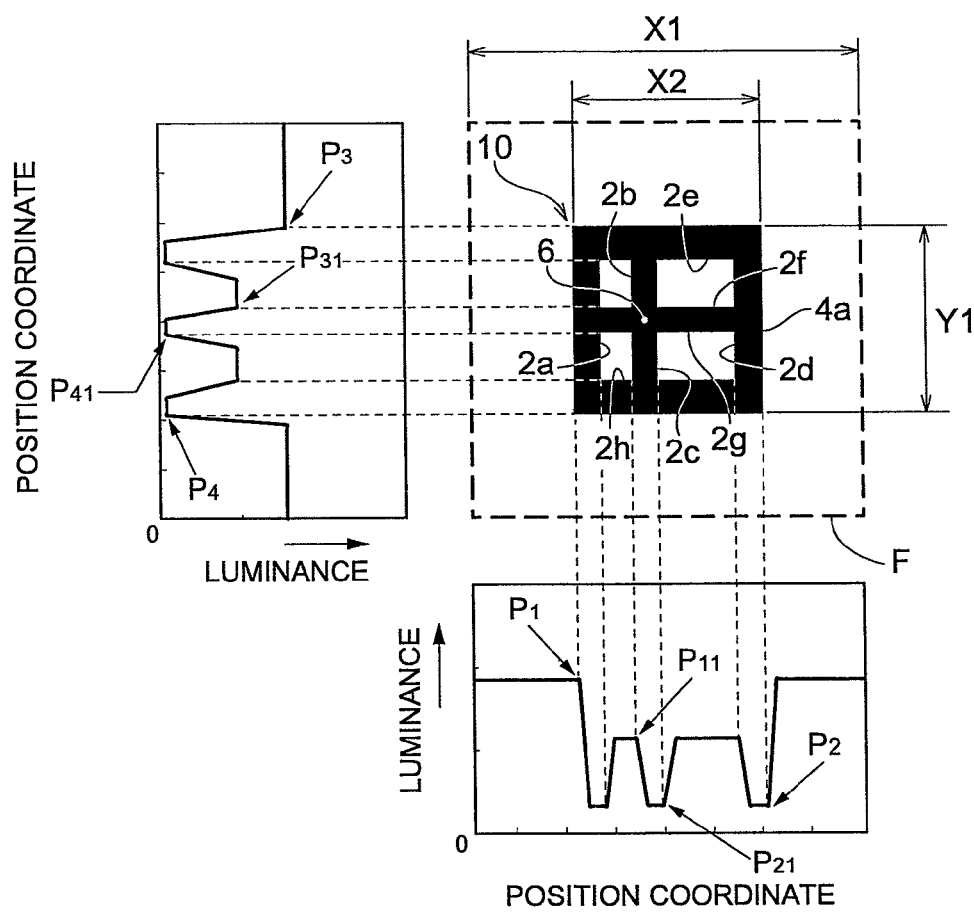
FIG. 12 is a diagram showing the calibration target and the luminance profile of another embodiment.

FIG. 12 shows a first luminance profile (the luminance profile shown in the lower part of the calibration target 10) and second luminance profile (the luminance profile shown in the left part of the calibration target 10) acquired in this manner. In particular, the second luminance profile which shows change in the luminance in the vertical direction shown in FIG. 12 is a luminance profile in which light measurement was carried out using X2 the elongated longitudinal direction. Even with such light measurement, the calibration target 10 can be specified to be positioned between the position at which the luminance is reduced from a constant value ($P_1$) and the position at which the luminance ($P_2$) was obtained prior to ultimately becoming a constant value, in the same manner as the luminance profile shown in FIG. 10. It is also possible to specify from the second luminance profile shown in FIG. 12 that the calibration target 10 is positioned between the position ($P_3$) at which the luminance was initially obtained and the position at which the luminance ($P_4$) was lastly obtained. It is also possible to specify as the center of the calibration target 10 the center point of two edges $P_{11}$ and $P_{21}$ in the first luminance profile, and the center point of two edge peak values $P_{31}$ and $P_{41}$ in the second luminance profile.

Figure 13:
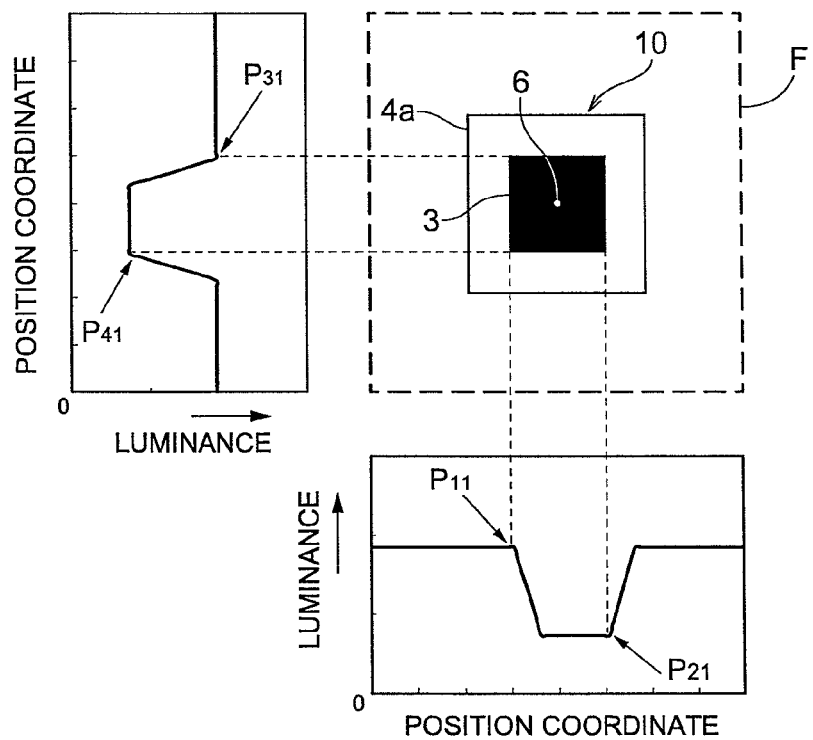
FIG. 13 is a diagram showing the calibration target and the luminance profile of another embodiment.

It is also possible to use the calibration target 10 shown in FIG. 13 as an example of a simple calibration target 10. The first luminance profile shows change in the luminance in the horizontal direction in the lower part of the calibration target 10 and the second luminance profile shows change in the luminance in the vertical direction in the left part of the calibration target 10. It is possible to advantageously generate a luminance profile even with a simple calibration target 10 such as that shown in FIG. 13. It can be specified from the first luminance profile shown in FIG. 13 that the calibration target 10 is positioned between the position at which the luminance is reduced from a constant value ($P_{11}$) and the position at which the luminance ($P_{21}$) was obtained prior to ultimately becoming a constant value. It is also possible to specify from the second luminance profile shown in FIG. 13 that the calibration target 10 is positioned between the position at which the luminance is reduced from a constant value ($P_{31}$) and the position at which the luminance ($P_{41}$) was obtained prior to ultimately becoming a constant value.

In the case that such a calibration target 10 is used, it is also possible to specify the center point 6 of the calibration target 10. In such a case, the center point of the two edges $P_{11}$ and $P_{21}$ in the first luminance profile is specified as the center in the horizontal direction. The center point of the two edges $P_{31}$ and $P_{41}$ in the second luminance profile is specified as the center in the vertical direction. Thus, the calibration target detection apparatus 200 according to the present invention can advantageously perform detection even with a simple calibration target 10 such as that shown in FIG. 13. With the calibration target 10 shown in FIG. 13, it is also possible to make the square shape inside the calibration target 10 into a circle, and it is apparent that other shapes are also possible. It is possible to advantageously specify the position and center point 6 of the calibration target 10 even with such a calibration target 10.

In the embodiment described above, the light-measuring unit 21 was described as measuring the luminance of the light measurement region RM set within the finder image of the onboard camera 20. In other words, the luminance was described as being measured using a captured image temporarily stored in buffer memory or the like provided to the onboard camera 20. However, the range of application of the present invention is not limited thereby. It is also possible to use a configuration in which the light measurement region RM is set and the luminance is measured with respect to the captured image acquired by the onboard camera 20, i.e., the captured image which is saved in memory or the like provided to the onboard camera 20. It is apparent that the calibration target detection apparatus 200 which performs such calibration is also included in the scope of rights of the present invention.

In the embodiment described above, the light measurement region setting unit 22 was described as being eight pixels in length in the crosswise direction of the light measurement region RM. Also, the movement distance for sliding and moving the light measurement region was described as being a single pixel. These are mere examples. Therefore, it shall be apparent that it is also possible to set a different distance and to use a configuration in which a light measurement region RM which has been subjected too light measurement earlier does not overlap in any manner a light measurement region RM set at a later point when the light measurement region is slid and moved.

In the embodiment described above, the calibration target detection apparatus 200 and a method for detecting the calibration target 10 were described. Apart from these inventions, a program of the calibration target detection apparatus 200 advantageously used in the calibration target detection apparatus 200 is also included in the scope of rights in the present invention. The characteristic features of the program are that a computer is made to execute a light measurement region setting function for setting a long light measurement region RM, and a detection function for detecting light measurement information of the light measurement region RM; a computer is made to execute a profile generation function for generating a first profile, wherein the long light measurement region RM taking a predetermined one direction as a long direction is scanned along the other direction orthogonal to the one direction, and the change in the light measurement information in the other direction is shown; and a second profile, wherein the long light measurement region RM taking the other direction as the long direction is scanned along the one direction, and the change in the light measurement information in the one direction is shown; and a computer is made to execute a position calculation function for calculating, on the basis of a characteristic point of the first and second profiles, a position of a calibration target 10 or a position of a predetermined location of the calibration target, the calibration target being used for calibrating an onboard camera 20, and the calibration target being included in a captured image acquired by the onboard camera 20. The program for the calibration target detection apparatus 200 can obtain the same effects as those described above for the calibration target detecting method for detecting a calibration target 10, which is an aspect of the present invention described above, and can be provided with the various additional aspects described above.

In the embodiment described above, one direction was described to be a vertical direction, and the other direction was described to be a horizontal direction. However, the range of application of the present invention is not limited thereby. It is apparent that it is also possible for the one direction to be a horizontal direction and for the other direction to be a vertical direction. It is also apparent that the one and the other directions can be directions other than the horizontal direction and the vertical direction. In other words, any direction may be used as long as the one and the other directions are mutually orthogonal.

In the embodiment described above, the setting of the light measurement region RM was described in terms of coordinates so that the light measurement region setting unit 22 slides and moves the light measurement region RM inside the calibration-target presence region F. However, the range of application of the present invention is not limited thereby. It is apparent that it is also possible to use a configuration in which the light measurement region setting unit 22 sets the light measurement region RM on the basis of, e.g., external input by a user. The use of such a configuration makes it possible for the user who will calibrate the onboard camera 20 to set an arbitrary light measurement region RM.

In the embodiment described above, the calibration target 10 was described as being disposed on a screen. However, the range of application of the present invention is not limited thereby. It is apparent that it is also possible for the calibration target 10 to be detected by the calibration target detection apparatus 200 even with, e.g., a calibration target 10 that has been painted on a floor surface.

In the embodiment described above, it was described that the position and center of the calibration target 10 are specified on the basis of the characteristic point of the first luminance profile and the second luminance profile with consideration given to the width of the light measurement region RM. However, the range of application of the present invention is not limited thereby. It is apparent that in the case that the width of the light measurement region RM is narrow, the position and center of the calibration target 10 can be specified ignoring the width.

In other words, it is possible to specify that the calibration target 10 is present between the position at which the luminance is reduced from a constant value ($P_1$) and the position at which the luminance ultimately becomes a constant value in the first luminance profile shown in FIG. 7, and to specify that the position of the peak $P_H$ is the intersection 6 on the calibration target 10. Also, it is possible to specify that the calibration target 10 is present between the position at which the luminance is reduced from a constant value ($P_3$) and the position at which the luminance ultimately becomes a constant value in the second luminance profile shown in FIG. 8, and to specify that the position of the peak $P_v$ is the intersection 6 on the calibration target 10. It is apparent that it is also possible to specify the position and center of the calibration target 10, thus ignoring the width of the light measurement region RM.

In the embodiment described above, it was described that the detection unit is a light-measuring unit 21, and that the light measurement information of the light measurement region RM is the luminance of the light measurement region RM. However, the range of application of the present invention is not limited thereby. It is apparent that the light measurement information of the light measurement region RM may also be the color information of the light measurement region RM. In such a case, it is advantageous to use a configuration in which, e.g., the calibration target 10 is divided into blue and red, which are colors known in the device side, and to detect the average color information of the light measurement region RM. It is possible to advantageously specify the position of the calibration target 10 even with such a configuration.

In the embodiment described above, the calibration target 10 was specified in a single scan each for the horizontal direction and the vertical direction, but the range of application of the present invention is not limited thereby. It is also possible to first generally specify the region in which the calibration target 10 is located by using a single scan each for the horizontal direction and the vertical direction, and then to scan the horizontal direction and the vertical direction each again in the specified region. In other words, it is also possible to repeat scanning. Repeat scanning in this manner makes it possible to specify the calibration target 10 with greater precision.

Figure 14:
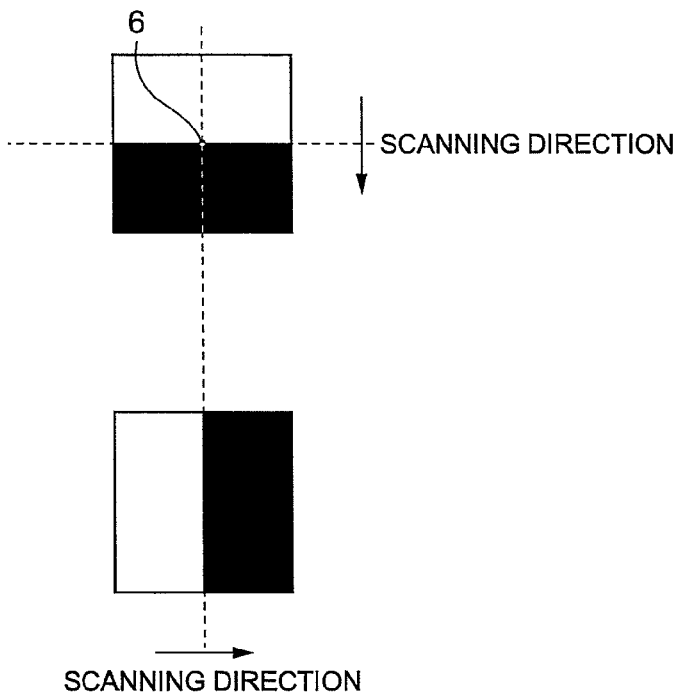
FIG. 14 is the calibration target according to another embodiment.

In the embodiment described above, it was described that a single calibration target 10 is scanned in the horizontal direction and the vertical direction to specify a center point 6 on the calibration target 10. However, the range of application of the present invention is not limited thereby. For example, it is also possible to arrange a calibration target 10 for the horizontal direction and a calibration target 10 for the vertical direction above and below each other as shown in FIG. 14. In such a case, the calibration target 10 for the vertical direction arranged on the upper side is scanned first in the vertical direction as shown in FIG. 14 to detect a reference line (indicated by a broken line in the lateral direction in FIG. 14) with respect to the vertical direction. The calibration target 10 for the horizontal direction arranged on the lower side is scanned second in the horizontal direction to detect a reference line (indicated by a broken line in the longitudinal direction in FIG. 14) with respect to the horizontal direction. The point of intersection can be specified as the center point 6 by the reference line in the vertical direction and the reference line in the horizontal direction. As shall be apparent, even when the calibration target 10 is used, it is possible for the position of the calibration target 10 to be advantageously specified.

Industrial Applicability

The present invention can be used as a calibration target detection apparatus that can be implemented at low cost without an increase in storage capacity, as a calibration target detecting method for detecting a calibration target, and as a program for the calibration target detection apparatus.

Description of Reference Marks

20: Onboard camera
21: Light-measuring unit (detection unit)
22: Light measurement region setting unit
23: Luminance profile generation unit (profile generation unit)
30: Position calculation unit
40: Corrective camera angle computing unit
41: Drawing unit
42: Display
200: Calibration target detection apparatus
300: Calibration apparatus

The invention claimed is:

1. A calibration target detection apparatus comprising:
a light measurement region setting unit for setting a long light measurement region;
a detection unit for detecting light measurement information of the light measurement region with a photometer provided to an onboard camera;
a profile generation unit for generating a first profile, wherein the long light measurement region taking a predetermined one direction as a long direction is scanned along the other direction orthogonal to the one direction, and the change in the light measurement information in the other direction is shown; and a second profile, wherein the long light measurement region taking the other direction as the long direction is scanned along the one direction, and the change in the light measurement information in the one direction is shown; and
a position calculation unit for calculating, on the basis of a characteristic point of the first and second profiles, a position of a calibration target or a position of a predetermined location of the calibration target, the calibration target being used for calibrating the onboard camera, and the calibration target being included in a captured image acquired by the onboard camera.

2. The calibration target detection apparatus according to claim 1, wherein the light measurement information of the light measurement region is the luminance of the light measurement region.

3. The calibration target detection apparatus according to claim 1, wherein the light measurement information of the light measurement region is the color information of the light measurement region.

4. The calibration target detection apparatus according to claim 1, wherein the calibration target has an angle with respect to a horizontal plane in the field of view of the onboard camera and to a perpendicular plane perpendicular to the horizontal plane; and a region partitioned by at least two straight lines that form an intersection is colored using a checkered pattern.

5. The calibration target detection apparatus according to claim 1, wherein the detection unit adjusts exposure on the basis of a predetermined threshold value set in advance.

6. The calibration target detection apparatus according to claim 1, wherein the characteristic point is at least one among an edge included in the first profile and the second profile, and a midpoint of two of the edges.

7. The calibration target detection apparatus according to claim 1, wherein the region detected by the detection unit is a calibration-target presence region, which is a portion of the captured image from the onboard camera.

8. The calibration target detection apparatus according to claim 7, wherein the calibration-target presence region is set on the basis of the mounting tolerance of the onboard camera.

9. A calibration target detecting method comprising:
   a light measurement region setting step for setting a long light measurement region;
   a detection step for detecting light measurement information of the light measurement region with a photometer provided to an onboard camera;
   a profile generation step for generating a first profile, wherein the long light measurement region taking a predetermined one direction as a long direction is scanned along the other direction orthogonal to the one direction, and the change in the light measurement information in the other direction is shown; and a second profile, wherein the long light measurement region taking the other direction as the long direction is scanned along the one direction, and the change in the light measurement information in the one direction is shown; and
   a position calculation step for calculating, on the basis of a characteristic point of the first and second profiles, a position of a calibration target or a position of a predetermined location of the calibration target, the calibration target being used for calibrating the onboard camera, and the calibration target being included in a captured image acquired by the onboard camera.

10. A non-transitory computer readable recording medium comprising a program for a calibration target detection apparatus, for causing a computer to execute:
   a light measurement region setting function for setting a long light measurement region;
   a detection function for detecting light measurement information of the light measurement region with a photometer provided to an onboard camera;
   a profile generation function for generating a first profile, wherein the long light measurement region taking a predetermined one direction as a long direction is scanned along the other direction orthogonal to the one direction, and the change in the light measurement information in the other direction is shown; and a second profile, wherein the long light measurement region taking the other direction as the long direction is scanned along the one direction, and the change in the light measurement information in the one direction is shown; and
   a position calculation function for calculating, on the basis of a characteristic point of the first and second profiles, a position of a calibration target or a position of a predetermined location of the calibration target, the calibration target being used for calibrating the onboard camera, and the calibration target being included in a captured image acquired by the onboard camera.

11. The calibration target detection apparatus according to claim 2, wherein the calibration target has an angle with respect to a horizontal plane in the field of view of the onboard camera and to a perpendicular plane perpendicular to the horizontal plane; and a region partitioned by at least two straight lines that form an intersection is colored using a checkered pattern.

12. The calibration target detection apparatus according to claim 3, wherein the calibration target has an angle with respect to a horizontal plane in the field of view of the onboard camera and to a perpendicular plane perpendicular to the horizontal plane; and a region partitioned by at least two straight lines that form an intersection is colored using a checkered pattern.

13. The calibration target detection apparatus according to claim 3, wherein the characteristic point is at least one among an edge included in the first profile and the second profile, and a midpoint of two of the edges.

14. The calibration target detection apparatus according to claim 4, wherein the characteristic point is at least one among an edge included in the first profile and the second profile, and a midpoint of two of the edges.

15. The calibration target detection apparatus according to claim 5, wherein the characteristic point is at least one among an edge included in the first profile and the second profile, and a midpoint of two of the edges.

16. The calibration target detection apparatus according to claim 2, wherein the region detected by the detection unit is a calibration-target presence region, which is a portion of the captured image from the onboard camera.

17. The calibration target detection apparatus according to claim 3, wherein the region detected by the detection unit is a calibration-target presence region, which is a portion of the captured image from the onboard camera.

18. The calibration target detection apparatus according to claim 4, wherein the region detected by the detection unit is a calibration-target presence region, which is a portion of the captured image from the onboard camera.

19. The calibration target detection apparatus according to claim 5, wherein the region detected by the detection unit is a calibration-target presence region, which is a portion of the captured image from the onboard camera.

20. The calibration target detection apparatus according to claim 6, wherein the region detected by the detection unit is a calibration-target presence region, which is a portion of the captured image from the onboard camera.

* * * * *